(12) United States Patent
Conner et al.

(10) Patent No.: US 8,813,339 B2
(45) Date of Patent: Aug. 26, 2014

(54) MULTILAYERED CELLULAR METALLIC GLASS STRUCTURES AND METHODS OF PREPARING THE SAME

(71) Applicant: California Institute of Technology, Pasadena, CA (US)

(72) Inventors: Robert D. Conner, Oak Hills, CA (US); Marios D. Demetriou, Los Angeles, CA (US); LeRoy A. Dunning, Caliente, CA (US); William L. Johnson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/624,820

(22) Filed: Sep. 21, 2012

(65) Prior Publication Data

US 2013/0074313 A1     Mar. 28, 2013

Related U.S. Application Data

(62) Division of application No. 11/841,702, filed on Aug. 20, 2007, now Pat. No. 8,298,647.

(51) Int. Cl.
| | | |
|---|---|---|
| *B23P 11/02* | (2006.01) | |
| *B32B 3/12* | (2006.01) | |
| *B32B 3/20* | (2006.01) | |
| *B32B 3/00* | (2006.01) | |
| *B32B 3/06* | (2006.01) | |
| *E04D 3/36* | (2006.01) | |

(52) U.S. Cl.
USPC ............... 29/453; 29/446; 428/116; 428/118; 428/188; 428/327; 428/72; 428/177; 428/192; 264/177.12; 264/630; 52/302.1

(58) Field of Classification Search
USPC ........ 428/116, 118, 188, 327, 72, 307.5, 177, 428/192; 264/177.12, 630; 52/302.1; 29/446, 450, 453
See application file for complete search history.

(56) References Cited

U.S. PATENT DOCUMENTS

| 3,678,558 A | * | 7/1972 | Fredericks | ................. 29/897.15 |
| 4,222,434 A | * | 9/1980 | Clyde | ............................ 165/10 |

(Continued)

FOREIGN PATENT DOCUMENTS

| JP | 2005166396 A | * | 6/2005 | ............. H01M 8/02 |
| WO | WO 2006059402 A1 | * | 6/2006 | ............. B21D 17/02 |

(Continued)

OTHER PUBLICATIONS

Machine Englich translation of JP 2005166396.*

(Continued)

*Primary Examiner* — Essama Omgba
(74) *Attorney, Agent, or Firm* — Polsinelli PC

(57) ABSTRACT

Multi-layered cellular metallic glass structures and methods of preparing the same are provided. In one embodiment, the cellular metallic glass structure includes at least one patterned metallic glass sheet and at least one additional sheet. The at least one patterned metallic glass sheet may include multiple sheets connected together to form a group of sheets, and the structure may include a group of sheets sandwiched between two outer sheets. The patterned metallic glass sheets may be patterned by thermoplastically forming two- and/or three-dimensional patterns in the metallic glass sheets. The metallic glass cellular structures are useful in a wide variety of applications, including but not limited to blast protection applications, energy absorption applications, structural support applications, biomedical implant applications, heat exchanger applications, thermal management applications, electrical shielding applications, magnetic shielding applications, and debris and radiation shielding for aerospace and outer space applications.

15 Claims, 13 Drawing Sheets

(56) References Cited

U.S. PATENT DOCUMENTS

| | | | |
|---|---|---|---|
| 4,256,039 A | 3/1981 | Gilman | |
| 4,477,012 A | 10/1984 | Holland et al. | |
| 4,964,927 A | 10/1990 | Shiflet et al. | |
| 5,180,619 A | 1/1993 | Landi et al. | |
| 5,224,249 A | 7/1993 | Kornely, Jr. | |
| 5,380,579 A | 1/1995 | Bianchi | |
| 5,445,689 A | 8/1995 | Kornely | |
| 5,649,455 A * | 7/1997 | Tsuchihashi et al. | 74/552 |
| 6,183,837 B1 | 2/2001 | Kim | |
| 6,188,028 B1 | 2/2001 | Haba et al. | |
| 6,736,942 B2 * | 5/2004 | Weihs et al. | 204/192.12 |
| 6,863,992 B2 * | 3/2005 | Weihs et al. | 428/607 |
| 6,991,855 B2 * | 1/2006 | Weihs et al. | 428/607 |
| 6,991,856 B2 * | 1/2006 | Weihs et al. | 428/635 |
| 7,017,645 B2 * | 3/2006 | Johnson et al. | 164/113 |
| 7,482,065 B2 * | 1/2009 | Branagan | 428/635 |
| 7,806,997 B2 * | 10/2010 | Demetriou et al. | 148/561 |
| 8,268,434 B2 * | 9/2012 | Levit | 428/116 |
| 8,298,647 B2 * | 10/2012 | Conner et al. | 428/116 |
| 8,383,231 B2 * | 2/2013 | Horigome et al. | 428/212 |
| 8,431,208 B2 * | 4/2013 | Demetriou et al. | 428/116 |
| 8,499,598 B2 * | 8/2013 | Johnson et al. | 72/54 |
| 2001/0038029 A1 | 11/2001 | Weihs et al. | |
| 2002/0182436 A1 * | 12/2002 | Weihs et al. | 428/635 |
| 2003/0164289 A1 * | 9/2003 | Weihs et al. | 204/192.12 |
| 2003/0222122 A1 * | 12/2003 | Johnson et al. | 228/101 |
| 2004/0149372 A1 * | 8/2004 | Weihs et al. | 156/196 |
| 2004/0149373 A1 * | 8/2004 | Weihs et al. | 156/196 |
| 2004/0247931 A1 * | 12/2004 | Weihs et al. | 428/635 |
| 2005/0028900 A1 | 2/2005 | Chu et al. | |
| 2005/0084407 A1 * | 4/2005 | Myrick | 419/66 |
| 2007/0267167 A1 * | 11/2007 | Kang | 164/479 |
| 2007/0269702 A1 * | 11/2007 | Nakajima et al. | 429/34 |
| 2008/0118387 A1 * | 5/2008 | Demetriou et al. | 419/66 |
| 2009/0053476 A1 * | 2/2009 | Conner et al. | 428/174 |
| 2012/0006085 A1 * | 1/2012 | Johnson et al. | 72/54 |
| 2012/0077052 A1 * | 3/2012 | Demetriou et al. | 428/593 |
| 2012/0208041 A1 * | 8/2012 | Hanan | 428/593 |
| 2012/0255338 A1 * | 10/2012 | Johnson et al. | 72/342.1 |
| 2012/0291618 A1 * | 11/2012 | Hanan | 89/36.02 |
| 2013/0074313 A1 * | 3/2013 | Conner et al. | 29/469.5 |
| 2013/0078417 A1 * | 3/2013 | Schmidt | 428/116 |
| 2013/0189479 A1 * | 7/2013 | Whitaker | 428/116 |
| 2013/0295321 A1 * | 11/2013 | Demetriou et al. | 428/116 |

FOREIGN PATENT DOCUMENTS

| | | | | |
|---|---|---|---|---|
| WO | WO 2009025637 A1 * | 2/2009 | | B27F 3/02 |
| WO | WO 2012040217 A1 * | 3/2012 | | B23B 15/04 |

OTHER PUBLICATIONS

Ashby et al., "Metallic glasses as structural materials," *Scripta Materialia*, 2006, vol. 54, pp. 321-326.

Cote et al., "The out-of-plane compressive behavior of metallic honeycombs," *Materials Science and Engineering*, 2004, vol. A380, pp. 272-280.

Demetriou et al., "Amorphous Fe-based metal foam," *Scripta Materialia*, 2007, vol. 57, pp. 9-12.

Demetriou et al., "A Damage-Tolerant Glass," *Nature Materials*, Feb. 2011, vol. 10, 6 pages.

Demetriou et al., "A Damage-Tolerant Glass," (Supplementary Discussion), *Nature Materials*, 2011, 9 pages.

Evans et al., "Multifunctionality of cellular metal systems," *Progress in Materials Scienc*, 1999, vol. 43, pp. 171-221.

Flores et al., "Enhanced Toughness Due to Stable Crack Tip Damage Zones in Bulk Metallic Glass," *Scripta Mater*, 1999, vol. 41, p. 937.

Gibson et al., *Cellular solids structure and properties—Second edition*, Chapter 1 Introduction, 1997, Cambridge University Press, 6 pages.

Wadley et al., "Fabrication and structural performance of period cellular metal sandwich structures," *Composites Science and Technology*, 2003, vol. 63, pp. 2331-2343.

\* cited by examiner

In-plane loaded cellular core

Out-of-plane loaded cellular core

MULTILAYERED CELLULAR METALLIC GLASS STRUCTURES AND METHODS OF PREPARING THE SAME

This application is a divisional of U.S. patent application Ser. No. 11/841,702, entitled "MULTILAYERED CELLULAR METALLIC GLASS STRUCTURES AND METHODS OF PREPARING THE SAME", filed on Aug. 20, 2007, now U.S. Pat. No. 8,298,647, which is incorporated by reference in its entirety as if fully disclosed herein.

FIELD OF THE INVENTION

The invention is directed to multilayered cellular structures of metallic glass.

BACKGROUND OF THE INVENTION

Cellular crystalline metal structures and methods of their manufacture are known, and have been used in a variety of applications, including impact/blast amelioration systems, heat dissipation media, and acoustic isolation applications. These cellular crystalline metal structures typically include sheets of aluminum or other metal and include corrugated metal sheets sandwiched between and bonded to unformed sheets, thereby producing stiff, low density cellular metal structures. The ability of a cellular structure to absorb imparted kinetic energy is directly dependent on the solid material's specific strength, i.e. yield strength divided by density. Accordingly, cellular structures made of low specific strength solids, such as those used in the corrugated metal sheets, do not absorb large amounts of imparted kinetic energy. In addition, the materials used to produce the corrugated metal sheets in these structures exhibit limited solid-state formability, making the corrugated sheets difficult to produce.

SUMMARY OF THE INVENTION

The present invention is directed to multi-layered cellular structures of metallic glass, which can be used for a wide variety of applications, such as blast protection, impact mitigation, energy absorption, structural support, biomedical implants, heat exchangers, thermal management, electrical shielding, magnetic shielding, and debris and radiation shielding for aerospace and outer space applications. Metallic glasses exhibit densities comparable to conventional crystalline metals, but have far superior yield strengths. Consequently, metallic glasses offer unparalleled improvements in specific strength and energy absorption when used in cellular applications. Also, unlike crystalline metals, metallic glasses exhibit excellent formability when heated above the glass transition temperature and retain their mechanical properties when cooled to room temperature prior to crystallization. According to embodiments of the present invention, planar amorphous metals are processed into extremely low density, high strength, and plastically deformable cellular cores for cellular structure construction. Owing to the excellent micro-replication capabilities of metallic glasses, structures requiring close tolerances can be easily formed, such as protrusions to allow snap assembly. In addition, micro-formation of metallic glass ribbons can be performed to fabricate cellular structures having micro-cores exhibiting high toughness and ductility but resistant to elastic buckling.

BRIEF DESCRIPTION OF THE DRAWINGS

The above and other features and advantages of the present invention will be better understood by reference to the following detailed description when considered in conjunction with the attached drawings in which.

DETAILED DESCRIPTION OF THE INVENTION

The present invention is directed to cellular metallic glass structures and to methods of preparing the structures. In one embodiment, a metallic glass structure includes at least first and second sheets, where at least one of the first and second sheets is a metallic glass sheet. According to one embodiment, for example, a structure includes at least one metallic glass sheet sandwiched between two outer sheets. In another embodiment, the at least one metallic glass sheet may be sandwiched between two outer sheets and the structure may further include at least one intermediate sheet. The use of at least one metallic glass sheet, for example, that is properly corrugated to form a fracture-resistant and buckling-resistant cellular core, provides a structure that is low in density, high in strength, and has good plastic deformability, all of which result in a high energy absorption capability. These properties are unequalled by similarly constructed structures of crystalline metal sheets.

Figure 10A:
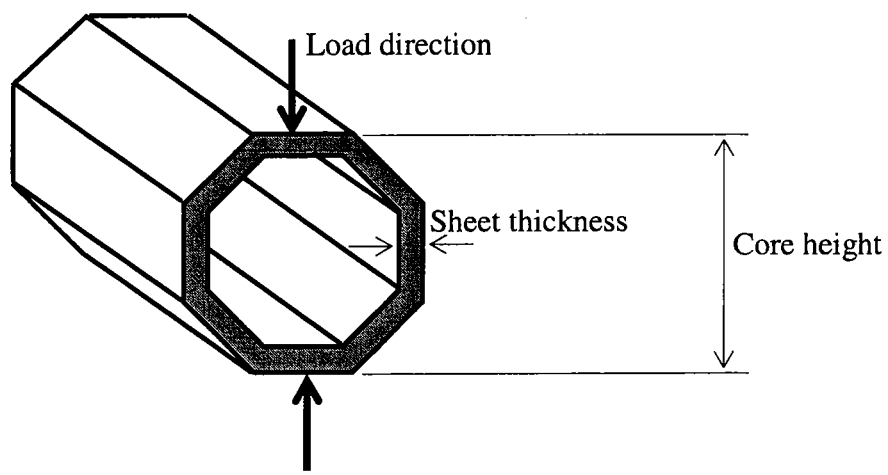
FIG. 10A is a perspective view of a metallic glass core according to one embodiment of the present invention.
Figure 10B:
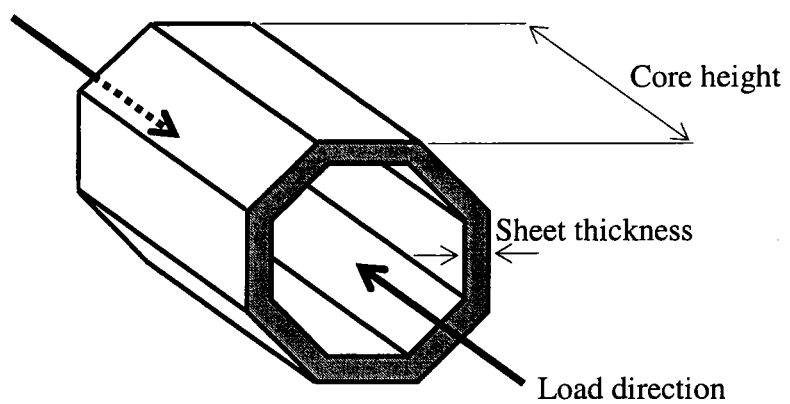
FIG. 10B is a perspective view of a metallic glass core according to another embodiment of the present invention.

In one embodiment, the metallic glass sheet may be formed into a metallic glass core, which can be an in-pane loaded cellular core (FIG. 10A) or a out-of-plane loaded cellular core (FIG. 10B). The metallic glass core can be designed to maximize the energy absorption capability of the resulting structure by ensuring that the core fails by plastic yielding when dynamically loaded, rather than by brittle fracture or elastic buckling. For the core to evade brittle fracture, the thickness of the metallic glass sheet should be below the "plastic zone thickness" of the material. The "plastic zone thickness" is the thickness below which the material resists crack formation, and is proportional to the square of the fracture toughness over the yield strength of the material. Metallic glasses have "plastic zone thickness" values ranging between 1 pm and 1 mm, going from brittle to tough glasses. "Plastic zone thickness" values for several metallic glasses are listed in M. F. Ashby and A. L. Greer, "Metallic Glasses as Structural Materials," Scripta Materialia, Vol. 54, pp. 321-326 (2006), the entire content of which is incorporated herein by reference. To ensure resistance to brittle fracture, the sheet thickness should not exceed the "plastic zone thickness" of the metallic glass. Therefore, the thickness of the sheet will depend on the metallic glass chosen for sheet formation For the core to evade elastic buckling, the characteristic "core aspect ratio" (core height in the direction of loading divided by sheet thickness) should not exceed a critical value at which core buckling becomes possible. The critical "core aspect ratio" is determined by the elastic strain limit of the material (which for metallic glasses is approximately 0.02), as well as the core design geometry. The manner in which different core design geometries determine the criteria for core buckling is discussed in H. N. G. Wadley, N. A. Fleck, and A. G. Evans, "Fabrication and Structural Performance of Periodic Cellular Metal Sandwich Structures," Composite Science and Technology, Vol. 63, pp. 2331-2343 (2003), the entire content of which is incorporated herein by reference. To ensure that the core can resist elastic buckling, the "core aspect ratio" should not exceed the critical value associated with core buckling. Therefore, the "core aspect ratio" of the sheet will depend on the chosen core design geometry and the direction of applied load.

When sheets with small thicknesses are chosen, the cellular cores should be fabricated with small heights as well in order to maintain the "core aspect ratio" below the critical value associated with core buckling. One such case can arise when a brittle metallic glass characterized by a microscopic "plastic zone thickness" is chosen. In that case, microscopic sheet thicknesses are required to evade brittle fracture, and accordingly, microscopic core heights are required to evade elastic buckling. In such a case, micro-corrugation of micro-sheets becomes necessary to fabricate fracture-resistant and buckling-resistant micro-cores.

The metallic glass sheet of the structure may be made of any suitable metallic glass alloy. Nonlimiting examples of suitable metallic glass alloys include Fe-based alloys, Co-based alloys, Mg-based alloys, Al-based alloys, Zr-based alloys, Au-based alloys, Pt-based alloys, Ni-based alloys, Pd-based alloys and rare earth-based alloys. In particular, one nonlimiting example of a suitable Fe-based alloy is $Fe_{80}C_8P_{12}$, one nonlimiting example of a suitable Co-based alloy is $Co_{69}Fe_4Ni_1Mo_2B_{12}Si_{12}$, one nonlimiting example of a suitable Mg-based alloy is $Mg_{65}Gd_{10}Cu_{25}$, one nonlimiting example of a suitable Al-based alloy is $Al_{85}Ni_6Fe_3Gd_6$, one nonlimiting example of a suitable Zr-based alloy is $Zr_{57}Nb_5Cu_{15}Ni_{13}Al_{10}$, one nonlimiting example of a suitable Au-based alloy is $Au_{49}Ag_{5.5}Pd_{2.3}Cu_{26.9}Si_{16.3}$, one nonlimiting example of a suitable Pt-based alloy is $Pt_{57.5}N_{15.3}Cu_{14.7}P_{22.5})$ one nonlimiting example of a suitable Ni-based alloy is $Ni_{60}Nb_{35}Sn_5$, one nonlimiting example of a suitable Pd-based alloy is $Pd_{77.5}Cu_6Si_{7.5}$, and one nonlimiting example of a suitable rare earth-based alloy is $La_{55}Al_{25}Ni_{20}$.

In addition to the at least one metallic glass sheet, the structures according to embodiments of the present invention further include at least one additional sheet, such as an outer sheet or an intermediate sheet. The material of this additional sheet may be any suitable material. Nonlimiting examples of suitable materials for this sheet include polymers, epoxies, glasses, wood, ceramics, metals (such as high strength sheet metals), metallic glasses and composites thereof. In addition, in one embodiment, the additional sheet may be made of the same material as the metallic glass sheet. In embodiments including more than one additional sheet, the additional sheets may be made of the same material or may be made of different materials.

Figure 5:
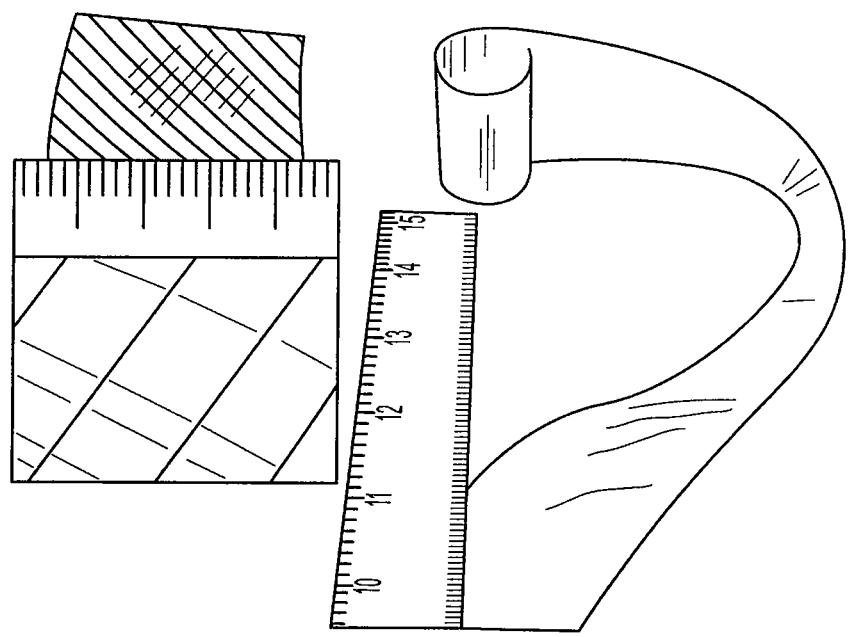
FIG. 5 is a photograph of a $Co_{69}Fe_4Ni_1Mo_2B_{12}Si_{12}$ ribbon, where the inlaid photographs depict plastic deformation of the ribbon produced by a knurling tool at room temperature.
Figure 7A:
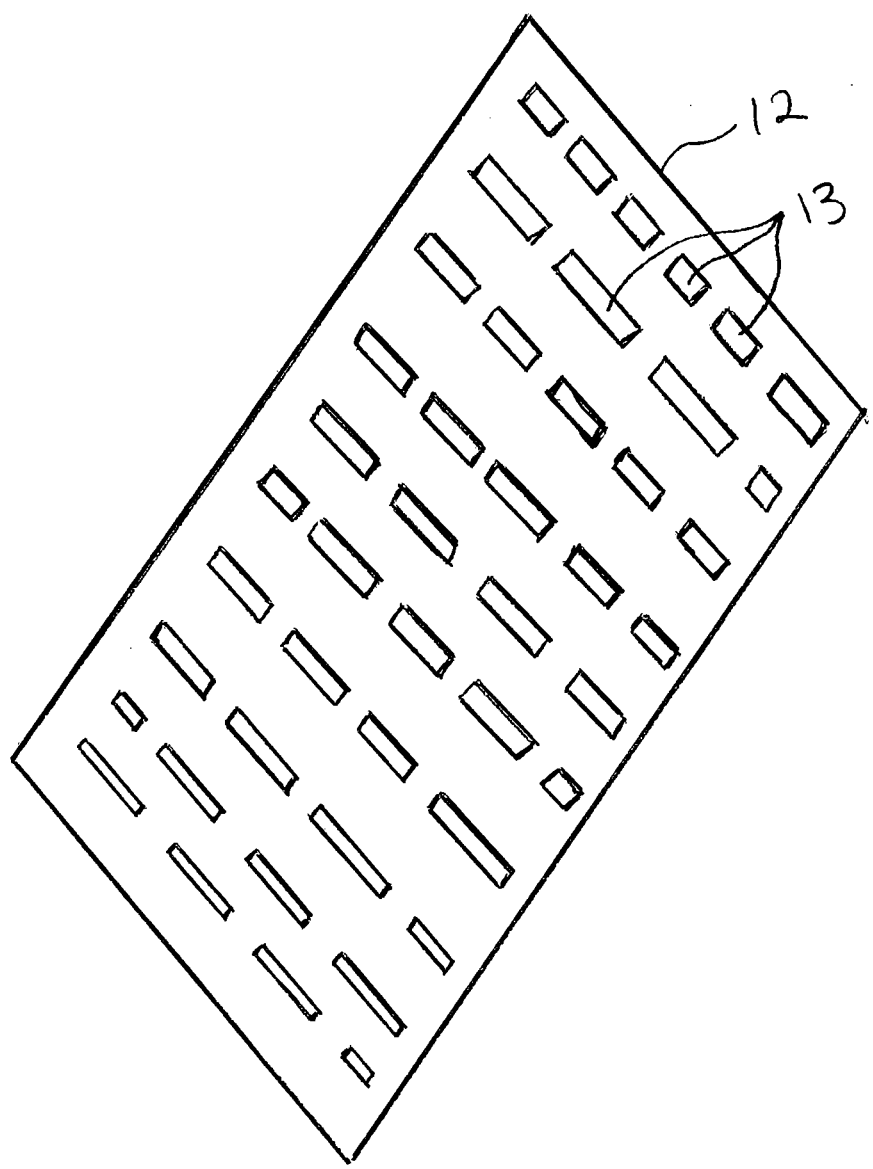
FIG. 7A is a perspective view of a metallic glass sheet according to one embodiment of the present invention.

The at least one metallic glass sheet of the structure has a thickness below the "plastic zone thickness" of the material, and is patterned to produce a 2D and/or 3D structure in the sheet. As noted above, the sheet can be formed into a cellular core with a "core aspect ratio" below the critical value associated with core buckling. In one embodiment, for example, the metallic glass sheet 12 includes a 2D structure such as slits or small openings 13 in the sheet, as shown in FIG. 7A. Although shown as slits or openings cut into the metallic glass sheet, the 2D pattern may be any suitable pattern. For example, as shown in FIG. 5, as an alternative to slits or openings in the sheet, the 2D pattern may be an imprint in the surface of the sheet. FIG. 5 depicts a metallic glass sheet subjected to plastic deformation at room temperature from a knurling tool.

Figure 6:
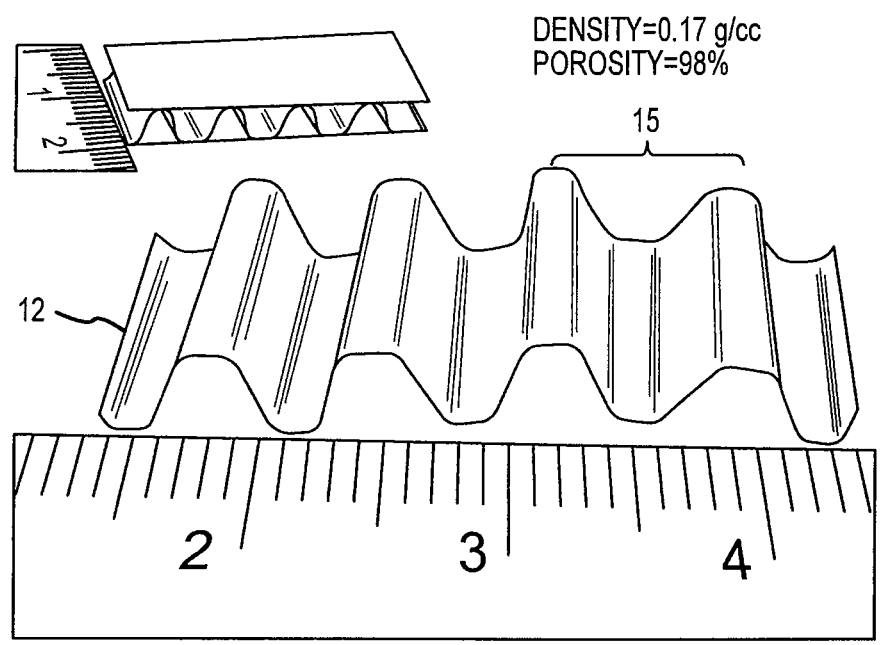
FIG. 6 is a photograph of a $Co_{69}Fe_4Ni_1Mo_2B_{12}Si_{12}$ ribbon after thermoplastic corrugation according to one embodiment of the present invention, where the inlaid photograph depicts a cellular metallic glass structure including the corrugated ribbon.

In another exemplary embodiment, the metallic glass sheet 12 includes a 3D pattern, such as a corrugated pattern 15, as shown in FIG. 6. Although the 3D pattern is illustrated as a generally sinusoidal pattern, any suitable 3D pattern may be used. For example, in addition to a generally sinusoidal shape, the 3D pattern may be a zig-zag or similar shape.

Figure 7B:
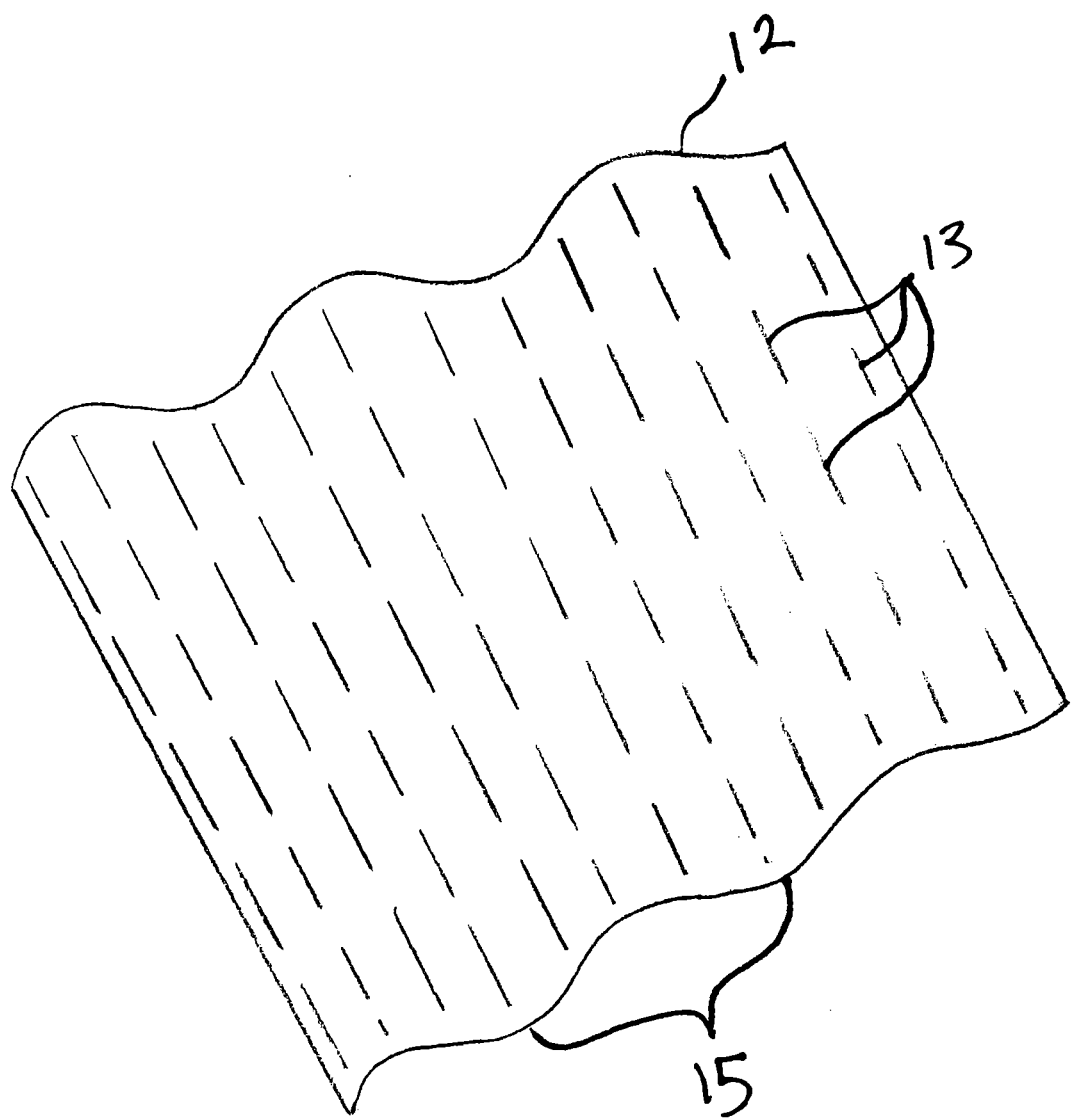
FIG. 7B is a perspective view of a metallic glass sheet according to yet another embodiment of the present invention.

In yet another embodiment, the metallic glass sheet 12 includes both a 2D and a 3D structure. For example, a sheet may include both slits or openings 13 and a corrugated pattern 15, as shown in FIG. 7B.

The at least one additional sheet may also be patterned to produce a 2D and/or a 3D structure in the sheet. The 2D and 3D patterns discussed above for the metallic glass sheet are also useful for the at least one additional sheet.

Figure 8:
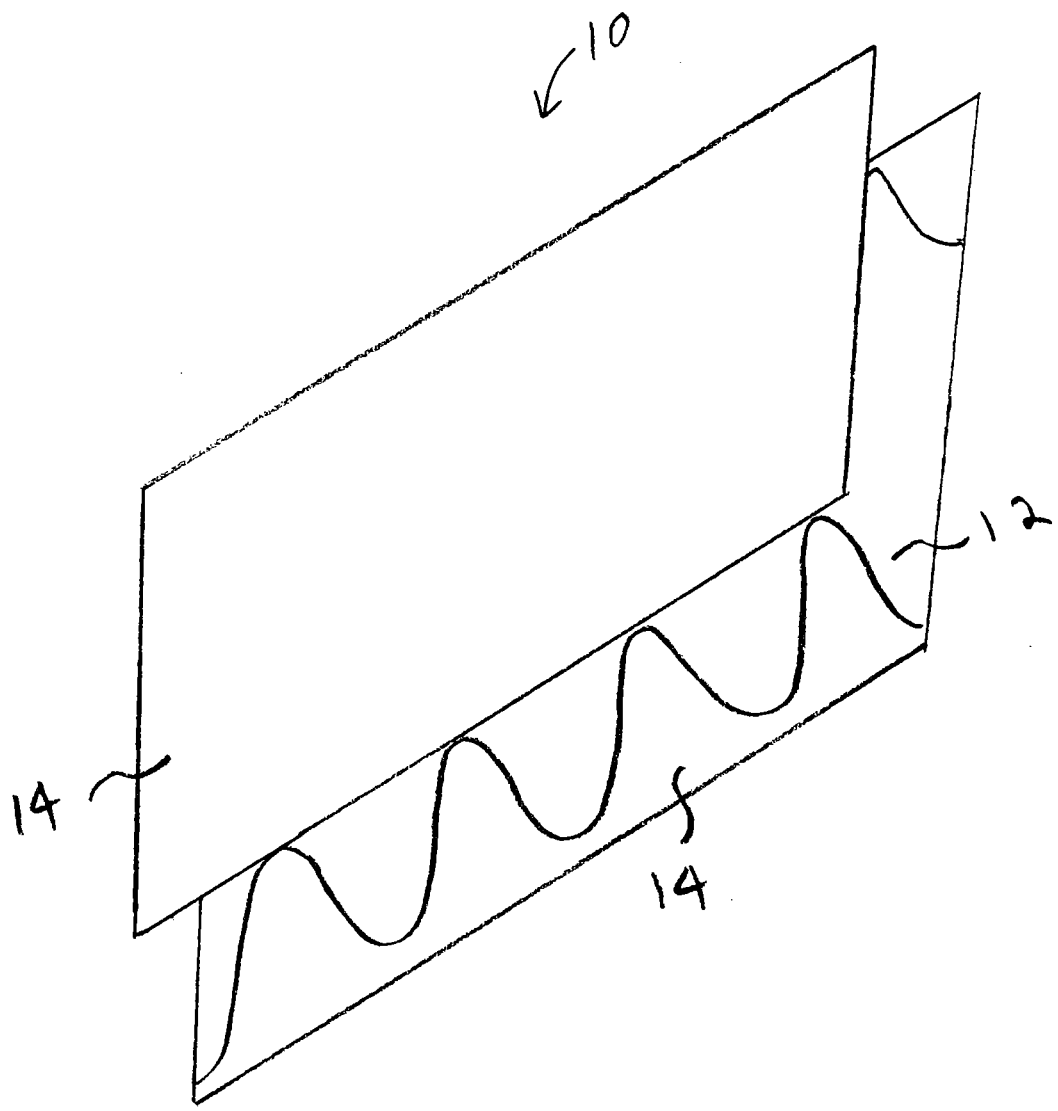
FIG. 8 is a perspective view of a metallic glass cellular structure according to one embodiment of the present invention.
Figure 9A:
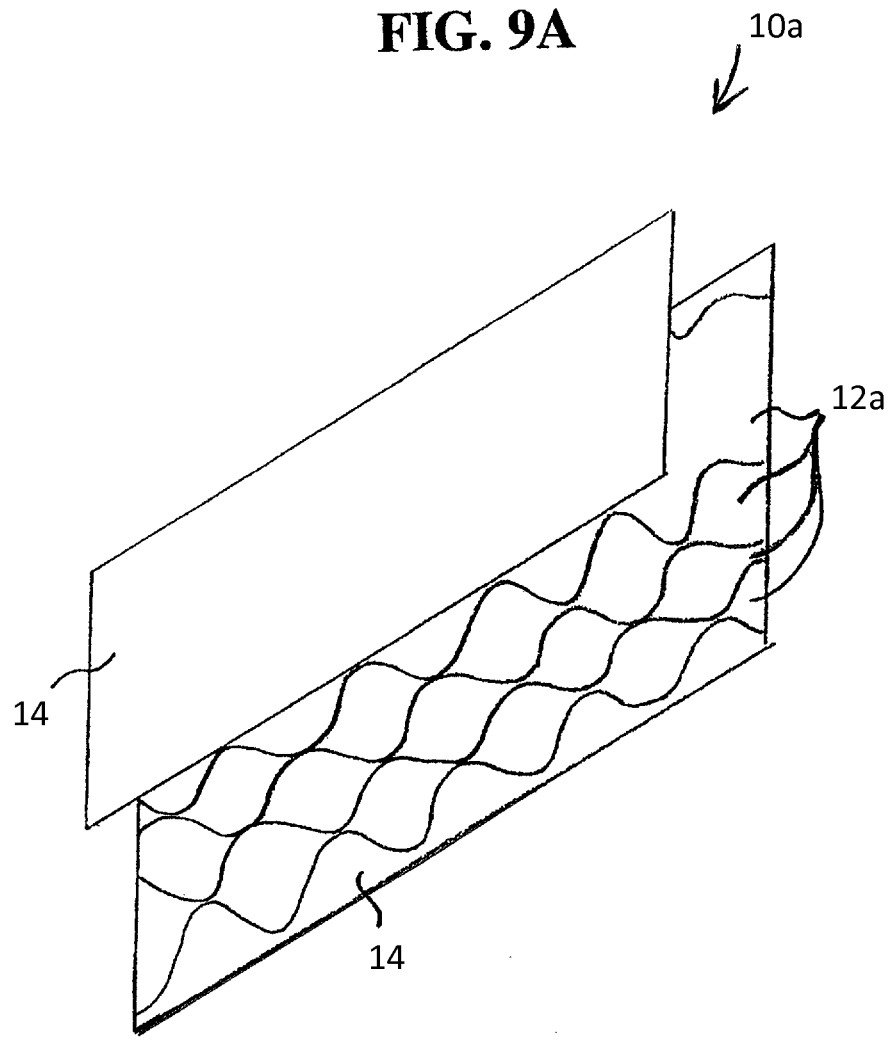
FIG. 9A is a schematic view of a metallic glass cellular structure according to another embodiment of the present invention.
Figure 9B:
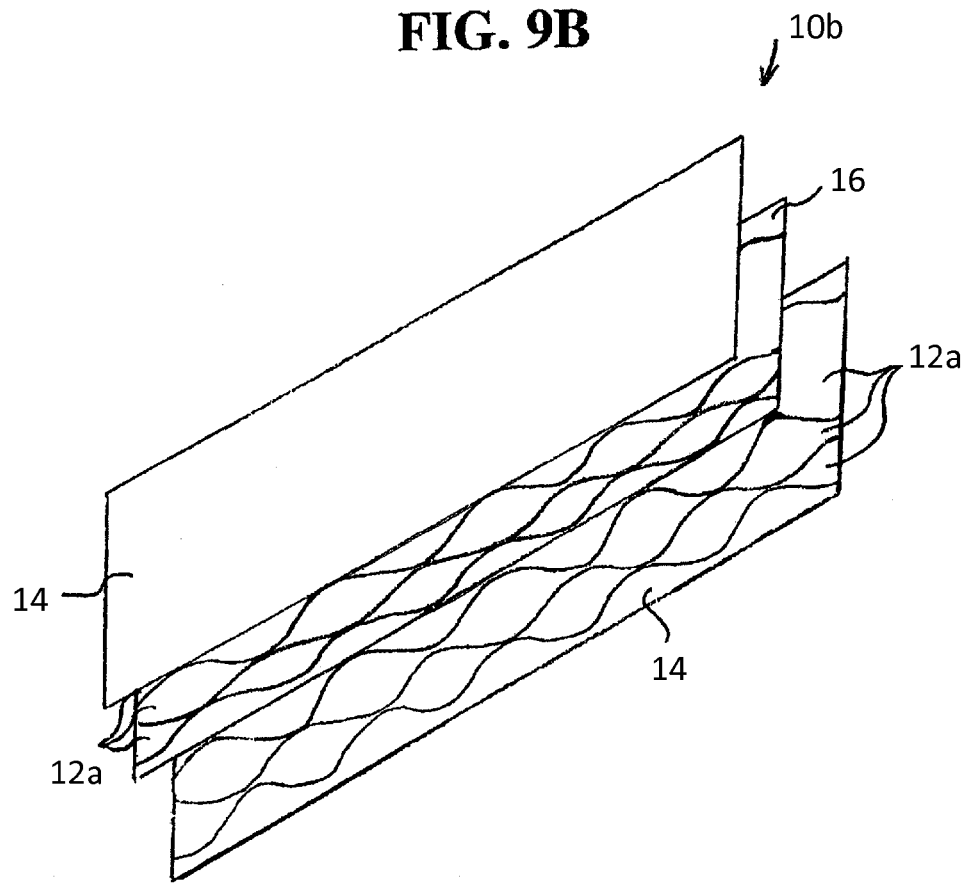
FIG. 9B is a perspective view of a metallic glass cellular structure according to another embodiment of the present invention.

According to one embodiment of the present invention, as shown in FIG. 8, a metallic glass structure 10 includes at least one patterned metallic glass sheet 12 sandwiched between two outer sheets 14. In one embodiment, as shown in FIG. 9A, the at least one metallic glass sheet includes at least two metallic glass sheets 12a stacked on top of each other or otherwise combined to form a group of metallic glass sheets 12a. The group of metallic glass sheets 12a may be sandwiched between two outer sheets 14 to complete a metallic glass structure 10a, as shown in FIG. 9A. Alternatively, groups of metallic glass sheets 12a may be separated by one or more intermediate sheets 16 to form a multi-tiered metallic glass structure 10b, as shown in FIG. 9B.

In another embodiment of the present invention, a method of making a metallic glass structure includes first making a patterned metallic glass sheet by heating a planar metallic glass sheet to a temperature conducive to thermoplastic forming. This temperature may be any temperature between the glass transition temperature ($T_g$) and the crystallization temperature ($T_x$) of the material making up the planar metallic glass sheet. Then, appropriate pressure is applied in order to produce the desired 2D and/or 3D pattern in the sheet. In one embodiment, the pressure may range from about 1 to about 10,000 MPa. After forming a pattern, the metallic glass sheet is cooled prior to crystallization.

Figure 1:
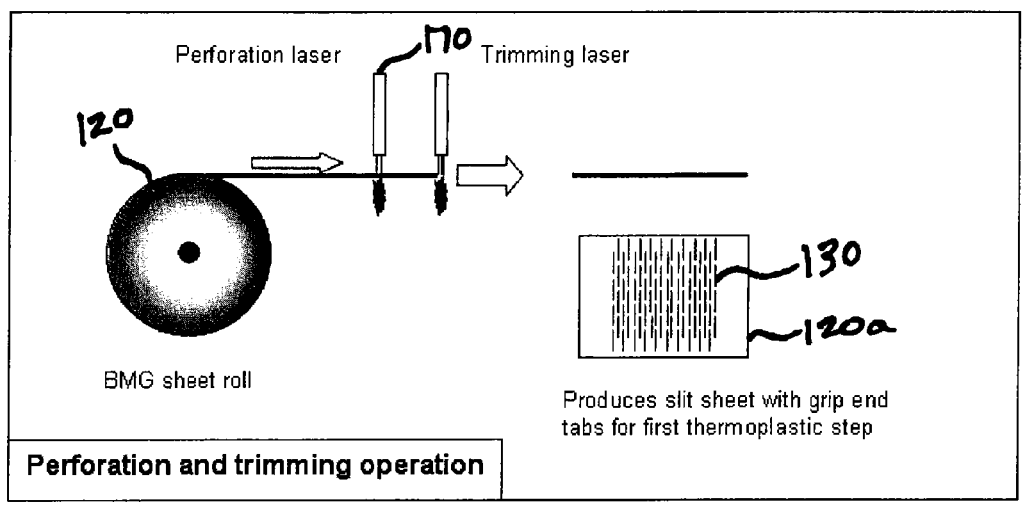
FIG. 1 is a schematic depicting a method of patterning a metallic glass sheet according to one embodiment of the present invention.
Figure 2:
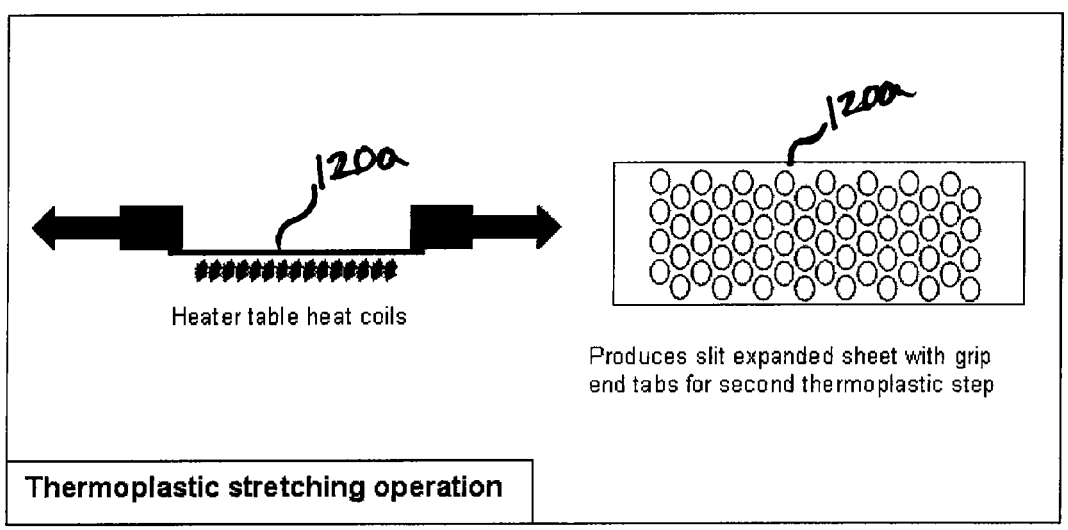
FIG. 2 is a schematic depicting a method of stretching a metallic glass sheet according to one embodiment of the present invention.
Figure 3:
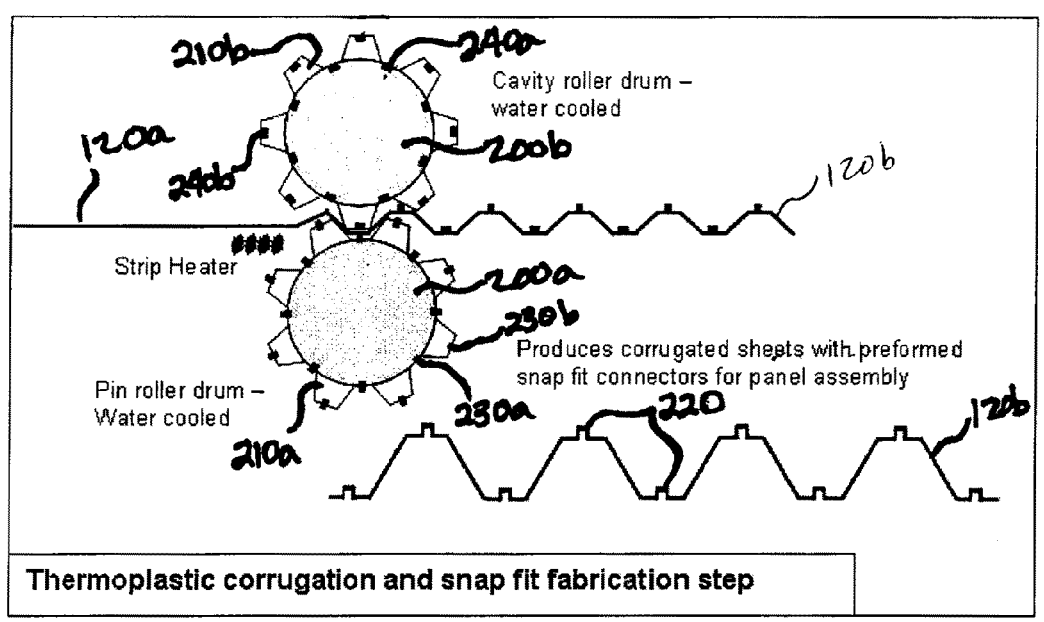
FIG. 3 is a schematic depicting a method of corrugating a metallic glass sheet according to one embodiment of the present invention.

FIGS. 1 through 3 depict an exemplary method of preparing a patterned metallic glass sheet according to an embodiment of the present invention. As shown in FIG. 1, a 2D pattern is first formed in a planar metallic glass sheet 120 by creating slits 130 in the sheet with a cutting tool 170, such as a laser, to form a two-dimensionally patterned metallic glass sheet 120a. The two-dimensionally patterned metallic glass sheet 120a is then trimmed to size with a suitable tool, such as a laser. Then, as shown in FIG. 2, the two-dimensionally patterned sheet 120a is heated to a temperature conducive to thermoplastic forming and stretched or otherwise expanded to a desired length. Depending on the 2D pattern applied to the sheet, the stretching or expansion may create a system of open cells, a system of closed cells, or an imprinted surface having a surface texture dependent on the 2D pattern. The two-dimensionally patterned metallic glass sheet 120a is then heated to a temperature conducive to thermoplastic forming and three-dimensionally patterned to form a three-dimensionally patterned metallic glass sheet 120b, as shown in FIG. 3.

The metallic glass sheet may be three-dimensionally patterned by any suitable means. Nonlimiting examples of suitable such means include blow molding, injection molding, investment molding, superplastic forming, hot forging, explosive impact forming, stretching, bending and folding.

In one exemplary embodiment, as shown in FIG. 3, the metallic glass sheet is three dimensionally patterned by passing it between two roller drums 200a and 200b. The roller drums 200a and 200b are generally cylindrical and have teeth 210a and 210b, respectively, on their lengths and circumferences. The teeth 210a of the first roller drum 200a engage the teeth 210b of the second roller drum 200b. The two-dimensionally patterned metallic glass sheet 120a is passed between the teeth 210a of the first roller drum 200a and the teeth 210b of the second roller drum 200b. Upon passing between the teeth 210a and 210b of the roller drums 200a and 200b, the two-dimensionally patterned metallic glass sheet 120a is three-dimensionally patterned by pressure exerted on the sheet 120a by the teeth 210a and 210b of the roller drums 200a and 200b. Although the above method is described and illustrated in connection with a sheet that is both two-dimensionally and three-dimensionally patterned, it is understood that the method may be modified to create sheets that are either only two-dimensionally or only three-dimensionally patterned. For example, to make a sheet that is only two-dimensionally patterned, the second step of heating the sheet and the step of passing the sheet through the roller drums may be omitted. Also, to make a sheet that is only three-dimensionally patterned, the steps of cutting slits in the sheet and expanding the sheet may be omitted.

The teeth 210a and 210b of the roller drums 200a and 200b may take any suitable shape. For example, as shown in FIG. 3, the teeth may be generally trapezoidal in shape to form a sheet having a three dimensional pattern including generally trapezoidally shaped peaks and valleys. Alternatively, the teeth may be generally circular or semi-circular, generally ovular or semi-ovular, generally square, generally rectangular, or generally triangular in shape. However, the teeth are not limited to these shapes and may take any shape suitable to create the desired 3D pattern in the sheet.

In one embodiment of the present invention, as shown in FIG. 3, the three-dimensionally patterned metallic glass sheet includes small protrusions 220 acting as either snap fit fasteners or locator registration pins. When viewed from one side of the metallic glass sheet, the protrusions 220 are indeed protrusions extending outwardly from the surface of the sheet. However, when viewed from the opposite side of the sheet, the protrusions 220 are indentations in the surface of the sheet. These protrusions 220 enable fast and secure attachment of the metallic glass sheets to one another to form groups of metallic glass sheets for use in the construction of metallic glass structures. To form these protrusions 220 in the metallic glass sheet, the roller drum 200a includes protrusions 230a in the spaces between the teeth 210a, and the teeth 210a include protrusions 230b. Also, the roller drum 200b includes indentations 240a in the spaces between the teeth 210b, and the teeth 210b include protrusions 240b. Upon rolling the roller drums 200a and 200b, the protrusions 230a on the roller drum 200a engage the indentations 240b on the teeth 210b of the roller drum 200b, and the protrusions 230b on the teeth 210a engage the indentations 240a on the roller drum 200b. When the metallic sheet is passed through the roller drums 200a and 200b, the protrusions 230a and 230b force a portion of the metallic glass sheet into the indentations 240b and 240a, thereby forming the small protrusions 220 in the peaks and valleys of the metallic glass sheet.

Metallic glass sheets having 2D and/or 3D patterns may be formed thermoplastically in the supercooled liquid state, as shown in FIG. 6, which depicts a thermoplastically corrugated $Co_{69}Fe_4Ni_1Mo_2B_{12}Si_{12}$ ribbon. Such ribbons can be used to make cellular structures (shown in the inlay in FIG. 6) having a cellular density of about 0.17 glee, which corresponds to a porosity of 98%.

Metallic glass structures may be assembled in any suitable manner. As noted above, the structures may include one or more patterned metallic glass sheets sandwiched between two outer sheets, or may include groups of patterned metallic glass sheets separated by intermediate layers and sandwiched between two outer sheets. In embodiments including more than one patterned metallic glass sheet, the sheets may be stacked or otherwise connected or combined by any suitable means. Nonlimiting examples of suitable such means include welding, spot welding, laser welding, electron beam welding, soldering, use of adhesives, use of snap fits, diffusion bonding, transient melting, thermoplastic bonding in the supercooled liquid region, and bonding through an intermediate low glass-transition temperature alloy.

Figure 4:
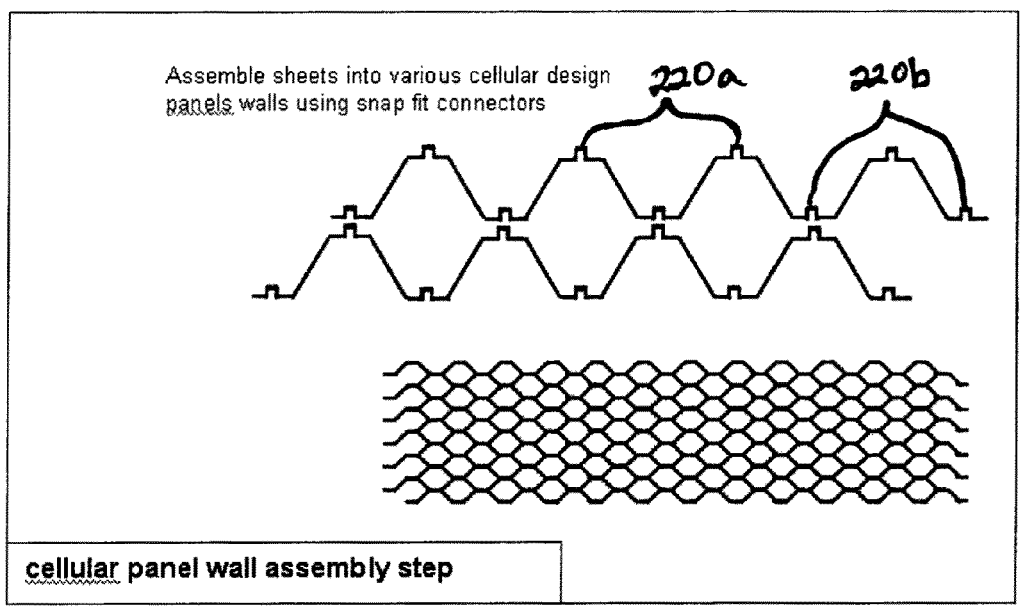
FIG. 4 is a schematic depicting the assembly of metallic glass sheets according to one embodiment of the present invention.

In embodiments in which the metallic glass sheets include snap fit protrusions (shown in FIG. 3), the metallic glass sheets can be connected through the snap fit protrusions 220. FIG. 4 depicts one method of connecting the metallic glass sheets including the protrusions 220. As shown, each metallic glass sheet includes protrusions 220a on the peaks and protrusions 220b on the valleys. When connecting two sheets, the protrusions 220a on the peaks of a top sheet are aligned with the protrusions 220b on the valleys of a bottom sheet. The protrusions 220b are snap fitted into the indentations of the protrusions 220a to connect to top and bottom sheets. Any number of metallic glass sheets may be connected in this manner to form groups of metallic glass sheets, such as the one shown in FIG. 4.

After connecting the desired number of patterned metallic glass sheets, the resulting groups of patterned metallic glass sheets may be sandwiched between two outer sheets, or may be separated by intermediate sheets to form multi-tiered structures that may then be sandwiched between two outer sheets. The patterned metallic glass sheets may be connected to the outer sheets or intermediate sheets by any suitable means. Nonlimiting examples of suitable such means include welding, spot welding, laser welding, electron beam welding, soldering, use of adhesives, use of snap fits, diffusion bonding, transient melting, thermoplastic bonding in the supercooled liquid region, and bonding through an intermediate low glass-transition temperature alloy.

To make metallic glass structures using patterned metallic glass sheets including snap fit protrusions, the top-most metallic glass sheet in a group of metallic glass sheets may omit the protrusions 220a on the peaks. The sheets still include the protrusions 220b in the valleys to facilitate attachment to the lower sheet, but the protrusions 220a on the peaks may be omitted to improve connection of the top-most sheet to the outer sheet of the structure. To fabricate a top-most patterned metallic glass sheet with protrusions 220b on the valleys but excluding protrusions on the peaks, the roller drums 200a and 200b may be modified accordingly. For example, the roller drum 200a includes protrusions 230a in the spaces between the teeth 210a, but the teeth 210a do not include any protrusions. Also, the roller drum 200b does not include indentations in the spaces between the teeth 210b, but the teeth 210h include protrusions 240b. Upon rolling the roller drums 200a and 200b, the protrusions 230a on the roller drum 200a engage the indentations 240b on the teeth 210b of the roller drum 200b. When the metallic sheet is passed through the roller drums 200a and 200b, the protrusions 230a force a portion of the metallic glass sheet into the indentations 240b, thereby forming the small protrusions 220 only in the valleys of the metallic glass sheet.

The multi-layered cellular metallic glass structures according to the present invention may be used in any suitable application. Nonlimiting examples of suitable such applications include blast protection applications, energy absorption applications, structural support applications, biomedical implant applications, heat exchanger applications, thermal management applications, electrical shielding applications, magnetic shielding applications, and debris and radiation shielding for aerospace and outer space applications.

While the present invention has been illustrated and described with reference to certain exemplary embodiments, those of ordinary skill in the art understand that various modifications and changes may be made to the described embodiments without departing from the spirit and scope of the present invention as defined by the following claims.

What is claimed is:

1. A method of manufacturing a cellular structure, the method comprising:
   heating at least one metallic glass sheet to a temperature conducive to thermoplastic formation, wherein the at least one metallic glass sheet has a thickness below a plastic zone thickness of the at least one metallic glass sheet;
   patterning the at least one metallic glass sheet;
   cooling the at least one metallic glass sheet;
   assembling the at least one metallic glass sheet with at least one additional sheet to form the cellular structure, wherein the cellular structure comprises a plurality of three dimensional cells, each cell being defined by a load axis defining a direction in relation to the cell in which a load is to be applied to the cell, and wherein the cell is configured such that the ratio of the height of the cell along the load axis to the thickness of the at least one metallic glass sheet is adapted to prevent buckling of the cellular structure.

2. The method according to claim 1, wherein the heating the at least one metallic glass sheet comprises heating the at least one metallic glass sheet to a temperature between a glass transition temperature and a crystallization temperature of a material of the at least one metallic glass sheet.

3. The method according to claim 1, wherein the patterning the at least one metallic glass sheet comprises two-dimensionally patterning the at least one metallic glass sheet.

4. The method according to claim 3, wherein the patterning the at least one metallic glass sheet comprises three-dimensionally patterning the at least one metallic glass sheet.

5. The method according to claim 1, wherein the patterning the at least one metallic glass sheet comprises three-dimensionally patterning the at least one metallic glass sheet.

6. The method according to claim 1, wherein the assembling the at least one metallic glass sheet with at least one additional sheet comprises sandwiching the at least one metallic glass sheet between two outer sheets to form the cellular structure.

7. The method according to claim 1, wherein the patterning the at least one metallic glass sheet comprises forming snap fit protrusions on the at least one metallic glass sheet.

8. The method according to claim 1, wherein the at least one metallic glass sheet comprises a material selected from the group consisting of Fe-based alloys, Co-based alloys, Mg-based alloys, Al-based alloys, Zr-based alloys, Au-based alloys, Pt-based alloys, Ni-based alloys, Pd-based alloys and rare earth-based alloys.

9. The method according to claim 1, wherein the at least one additional sheet comprises a material selected from the group consisting of polymers, epoxies, glasses, wood, ceramics, metals, metallic glasses and composites thereof.

10. A method of manufacturing a cellular structure, the method comprising:
    heating at least one metallic glass sheet having a thickness below the plastic zone thickness of the at least one metallic glass sheet to a temperature conducive to thermoplastic formation;
    two-dimensionally patterning the at least one metallic glass sheet to form at least one two-dimensionally patterned metallic glass sheet;
    heating the at least one two-dimensionally patterned metallic glass sheet to a temperature conducive to thermoplastic formation;
    three-dimensionally patterning the at least one two-dimensionally patterned metallic glass sheet to form at least one three-dimensionally patterned metallic glass sheet
    cooling the at least one three-dimensionally patterned metallic glass sheet;
    assembling the at least one three-dimensionally patterned metallic glass sheet with at least one additional sheet to form the cellular structure.

11. The method according to claim 10, wherein the heating the at least one metallic glass sheet comprises heating the at least one metallic glass sheet to a temperature between a glass transition temperature and a crystallization temperature of a material of the at least one metallic glass sheet, and wherein the heating the at least one two-dimensionally patterned metallic glass sheet comprises heating the at least one two-dimensionally patterned metallic glass sheet to a temperature between a glass transition temperature and a crystallization temperature of a material of the at least one two-dimensionally patterned metallic glass sheet.

12. The method according to claim 10, wherein the three-dimensionally patterning the at least one two-dimensionally patterned metallic glass sheet comprises forming snap fit protrusions on the at least one two-dimensionally patterned metallic glass sheet.

13. The method according to claim 10, wherein the cellular structure comprises a plurality of three dimensional cells, each cell being defined by a load axis defining a direction in relation to the cell in which a load is to be applied to the cell, and wherein the cell is configured such that the ratio of the height of the cell along the load axis to the thickness of the at least one metallic glass sheet is adapted to prevent buckling of the cellular structure.

14. The method according to claim 10, wherein the at least one metallic glass sheet comprises a material selected from the group consisting of Fe-based alloys, Co-based alloys, Mg-based alloys, Al-based alloys, Zr-based alloys, Au-based alloys, Pt-based alloys, Ni-based alloys, Pd-based alloys and rare earth-based alloys.

15. The method according to claim 10, wherein the at least one additional sheet comprises a material selected from the group consisting of polymers, epoxies, glasses, wood, ceramics, metals, metallic glasses and composites thereof.

* * * * *